Aug. 5, 1924.  
J. H. ACKROYD  
1,503,461  
DEVICE FOR REGULATING THE SUPPLY OF FUEL FOR GAS BURNERS  
Filed Aug. 11, 1920  
3 Sheets-Sheet 1
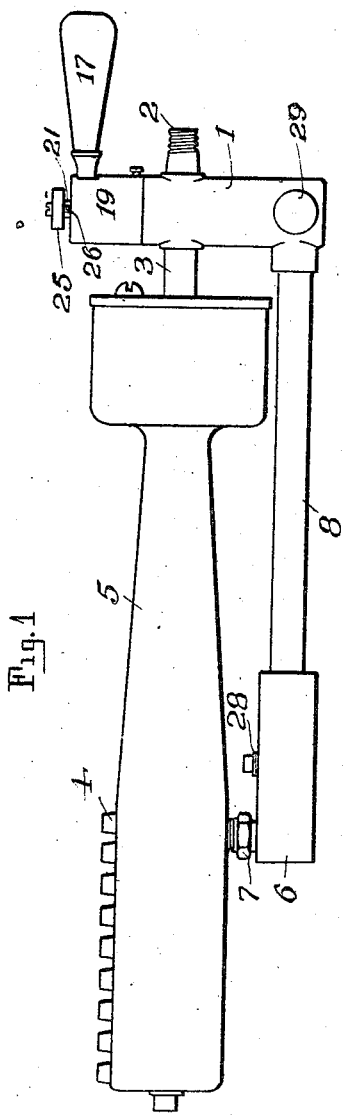
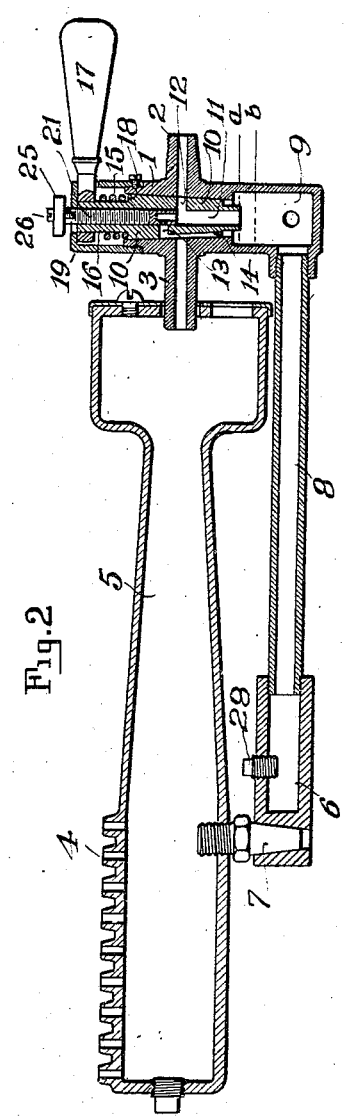
INVENTOR  
John H. Ackroyd.  
By  
ATTORNEY Aug. 5, 1924.
J. H. ACKROYD
1,503,461
DEVICE FOR REGULATING THE SUPPLY OF FUEL FOR GAS BURNERS
Filed Aug. 11, 1920   3 Sheets-Sheet 2
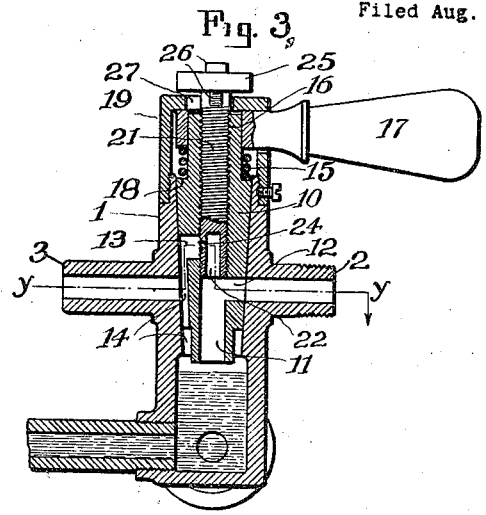
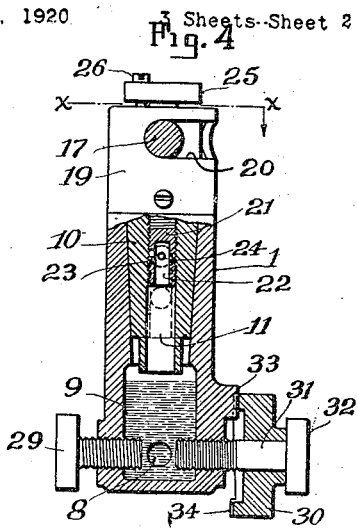
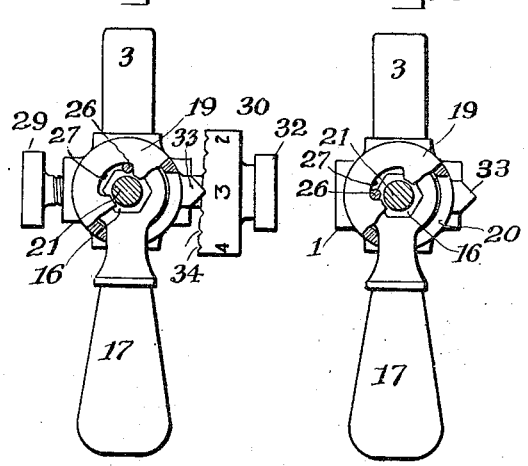
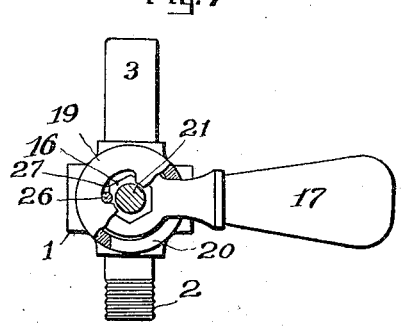
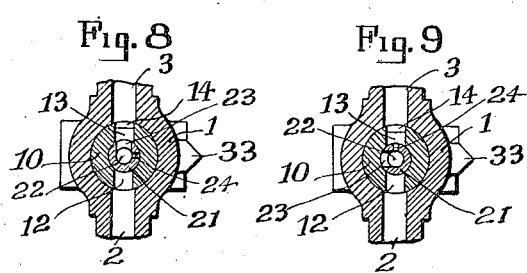
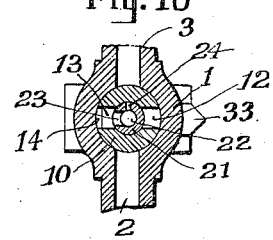
INVENTOR
John H. Ackroyd.
By
ATTORNEY Aug. 5, 1924. 1,503,461
J. H. ACKROYD
DEVICE FOR REGULATING THE SUPPLY OF FUEL FOR GAS BURNERS
Filed Aug. 11, 1920 3 Sheets-Sheet 3
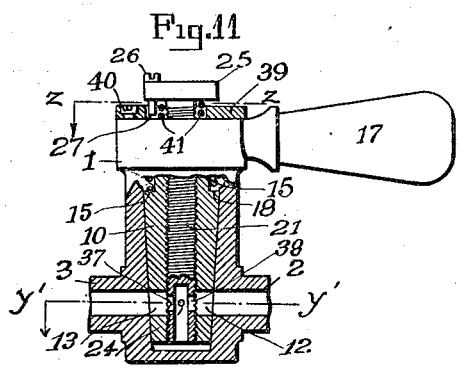
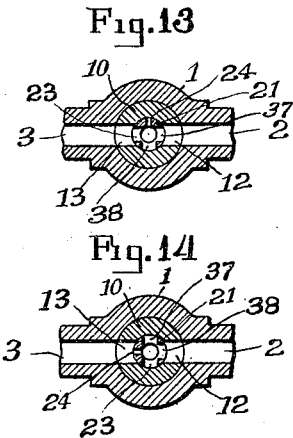
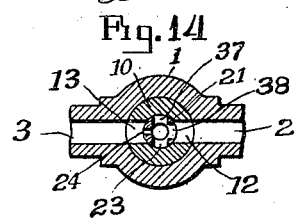
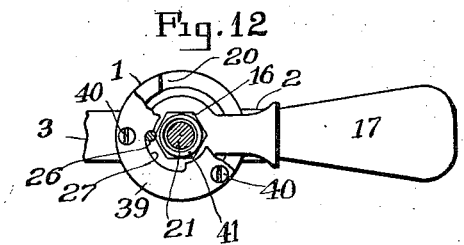
INVENTOR
John H. Ackroyd.
By
ATTORNEY Patented Aug. 5, 1924.

1,503,461

UNITED STATES PATENT OFFICE.

JOHN H. ACKROYD, OF BRIDGEPORT, CONNECTICUT.

DEVICE FOR REGULATING THE SUPPLY OF FUEL FOR GAS BURNERS.

Application filed August 11, 1920. Serial No. 402,878.

*To all whom it may concern:*

Be it known that I, JOHN H. ACKROYD, a citizen of the United States, residing at the city of Bridgeport, in the county of Fairfield and State of Connecticut, have invented certain new and useful Improvements in Devices for Regulating the Supply of Fuel for Gas Burners; and I do declare the following to be a full, clear, and exact description of the invention, such as will enable others skilled in the art to which it appertains to make and use the same.

This invention relates to improvements in devices for regulating the supply of fuel for gas burners, and, in addition to other good features which will be apparent from the description herein, has the following salient characteristics:—

First, a large auxiliary port is automatically positioned in communication with a primary outlet port in the gas plug whenever the latter is turned to open position, thus permitting the device to be used at all times as an ordinary cock.

Second, a full flow of gas may be obtained through a large auxiliary port, manually positioned, when the gas flow is otherwise automatically reduced.

Third, a minimum gas flow may be obtained through a small auxiliary port, manually positioned, while the gas plug is turned to a full open position, the automatic regulating feature, which includes the secondary outlet port of the gas plug, being dispensed with in this case.

Fourth, to provide in connection with a gas burner having a maximum flow gas port and a minimum flow gas port, both of which ports are adapted to be previously positioned to furnish a supply of gas to said burner, heat controlled means actuated by the heat of a wall of the burner to close said maximum flow gas port at the expiration of varying predetermined periods of time, and to maintain the closure of said maximum flow gas port so long as a supply of gas is permitted to flow to said burner through said minimum flow gas port.

One of the chief objects of this invention is to save the gas which is now wasted in connection with the heating of liquids in cooking utensils, or in similar operations in which gas is used as the heating agent; also to prevent the wastage of food caused by subjecting it to improper heat, and, furthermore, to save labor in cleaning burners and trays, which ordinarily become foul by the boiling over of liquids or food.

It is well known that, in cooking operations involving the boiling of liquids, the gas flow is allowed to continue after the liquid has become heated to the boiling point, and continues at full flow until the operator turns it off.

With these ends in view, and in order that this invention may be understood in all its phases, attention is called to the following detail description, reference being had to the accompanying drawings which form a part of this application, and in which—

Figure 1 is a side elevation of a structure made in accordance with this invention—

Figure 2, is a sectional elevation of the same.

Figure 3, is a detail sectional elevation, on an enlarged scale, of the casing and parts contained therein.

Figure 4, is a broken sectional elevation, cut in a plane at right angles to that which characterizes Figure 3.

Figures 5 and 6 are sections at the line $x$—$x$ of Figure 4, and respectively showing the position of parts when a large and a small auxiliary port are placed in communication with the primary outlet port of the gas plug.

Figure 7 is likewise a section at the line $x$—$x$ of Figure 4, and showing the position of parts when the gas plug is turned to cut off the gas supply.

Figures 8, 9, and 10, are sections at the line $y$—$y$ of Figure 3, and are cut when the parts are in the respective positions shown at Figures 5, 6, and 7.

Figure 11 is a broken sectional elevation similar to Figure 3, but showing a modified form of the invention such as would be utilized when the secondary outlet port of the gas plug was not present in the gas plug.

Figure 12 is a section at the line $z$—$z$ of Figure 11.

Figures 13 and 14, are sections at the line $y^1$—$y^1$ of Figure 11, and showing respectively the position of the ports when the gas plug is turned to admit or cut off the gas.

Similar numerals denote like parts in the several figures of the drawing in so far as such numerals can be employed without detracting from clearness and certainty in the detailed description of the various parts and their functions.

1 is a casing which has an intake nozzle 2 for connection with the gas supply, and an egress nozzle 3 which leads within any suitable burner structure 4.

6 is a base within which is fitted a post 7 whose upper end is tapped into the burner, and a pipe 8 rigidly connects the base 6 with the casing 1, so that it will be clear that the burner is supported upon the base 6, and the egress nozzle 3 held in central alinement with the mixer pipe 5.

The base 6 is hollow and forms a mercury containing chamber from which leads the pipe 8 that communicates with the lower part of the casing 1, the latter being generally hollow throughout its structure. This lower part of the casing will hereinafter be referred to as the "expansion chamber" and is designated by the numeral 9.

Heat for actuating the mercury in the hollow base 6 is conducted thereto through the post 7 from the burner body 4.

Snugly fitted within the casing is the tapered gas plug 10 which has a central bore 11 extending throughout its length, and leading into this bore are lateral ports 12 and 13 that are formed in opposite sides of the plug.

Referring particularly to Figure 3, it will be noted that these ports 12, 13, are staggered, the port 12 being the gas inlet port while the port 13 is the primary gas outlet port. But right here it is proper to state that while this arrangement of these ports is preferred in some instances, nevertheless such arrangement is not at all necessary since these ports may be diametrically opposite each other, and the invention is not limited in this respect.

From the lower end of the plug and leading upwardly through the body of the plug or, if desired, through the casing, is a channel 14 which communicates at the upper end with the egress nozzle 3, and, in the construction shown, this channel continues upwardly and also communicates with the primary outlet port 13.

In the arrangement shown at Figure 3, the secondary outlet port of the plug comprises the lower part of the central bore 11 below the inlet 12, and the channel 14, so that it will be evident that the gas may pass through the primary outlet port 13 into the burner, and also into the latter through the secondary outlet port.

Calling attention to the statement above that the plug inlet and primary outlet ports could be directly opposite each other, the feasibility of such an arrangement will now be apparent, the primary and secondary outlet ports would be clearly defined in the plug, the only difference being that the channel 14 would not be extended above the egress nozzle 3.

In fact, in the modification shown at Figure 11 and hereafter to be described, this opposite disposition of these inlet and outlet ports of the plug is clearly shown.

15 is a coil spring which surrounds a reduced portion 16 of the plug at the top of the latter, and 17 is a manipulating handle whose inner end is rigidly secured as to rotary movements to this portion 16 above the spring, the latter being confined between a shoulder 18 on the plug and said handle, the function of this spring being to keep the tapered plug snugly seated within the casing, and also to permit the portion 16 to have a slight vertical play within said end.

19 is a cap which is secured to the top of the casing and has formed in its side a slot 20 through which the handle 17 projects, the end walls of which slot act as stops to arrest the handle when it has been turned to the positions necessary to open or cut off the supply of gas to the burner.

The top of the cap 19 bears against the handle and thus holds the spring 15 under tension.

Manually adjusted means is employed for controlling the flow of gas through the primary outlet port of the plug, and this means will now be described in detail.

21 is a spindle which has a fine exterior thread, and this spindle is screwed within the upper part of the bore 11 which latter is threaded for this purpose. Referring more particularly to Figures 3, 4, 8, 9, and 10, this spindle extends in the plug to a point immediately above the gas inlet port 12 of the plug and has a central bore 22 in its lower end, and from this bore extend lateral large and small outlets 23 and 24 that are in the same horizontal plane with the primary outlet port 13 of the plug, so that it will be clear that this spindle may be turned to register either of these outlets with said port.

The upper end of this spindle extends through the top of the cap 19 and is provided with a head 25 for convenient manipulation and extending eccentrically through this head is a pin 26 which has a play within the recess 27 that is formed in the top wall of the cap, the end walls of which recess form stops to limit the turning of the spindle in either direction when the head is manipulated. This recess 27 and the slot 20 are so positioned relatively that the end walls of the recess are at right angles to the end walls of the slot, and the outlets 23 and 24 in the spindle are likewise in right angular disposition, and it will therefore be manifest that the turning of the spindle in reverse directions between its prescribed limits will alternately bring the outlets 23 and 24 into registration with the primary outlet port 13 of the plug, while the turning of the plug handle to open and closed positions will cause the plug and spindle to rotate in harmony whenever the pin 26 is in line with the handle, as will be obvious from Figures 5, 6, and 7. And it will also be clear that the handle cannot be turned to open position without bringing the large outlet in the spindle into registration with the primary outlet port 13 in the plug, the reverse of this being of course true in the event that the small and large outlets in the spindle were interchanged as to position.

Therefore, full flow of gas is always obtained to the egress nozzle 3 when this handle is swung from a closed to an open position, both through the port 13 and through the lower part of the bore 11 and the channel 14, and when it is desired to check the gas flow the spindle is turned to bring the small outlet 24 into registration with the port 13.

Now this manipulation of the spindle would not, of itself, materially affect the volume of gas flowing through the nozzle 3, so long as the secondary outlet port of the plug was open, and this latter port could be dispensed with if the improvement is used as an ordinary gas cock, as will be hereinafter explained, but it is greatly preferred that this secondary outlet port be retained, and that the flow of gas therethrough be automatically governed by specially contrived means which will now be described.

Mercury is poured into the chamber 6 through an opening that is closed by a filler plug 28 and will flow through the pipe 8 into the expansion chamber 9, and, in order that a detailed description presently to follow may be anticipated and may possibly be more clearly understood, it is deemed quite proper to now state that, under the agency of sufficient heat, the mercury will expand in the chamber 9 and will seal the lower end of the plug 10, thereby closing the secondary port of the plug.

If the small outlet 24 has previously been brought into registration with the primary outlet port 13, the closing of the secondary outlet port of the plug will limit the volume of gas supplied to the nozzle 3 to the minimum amount which now passes through the small outlet 24, of such size so that this minimum flow of gas is sufficient to maintain the heat of the burner body and the mercury and thus maintain the closure of the maximum flow gas port so long as such minimum flow of gas is permitted to continue to supply said burner.

Means is provided in the form of a screw threaded plug 29, designated as a setting plug, which enters the expansion chamber 9 through a side wall of the casing, and which setting plug is for the sole purpose of adjusting the mercury to establish a normal mercury level in said chamber 9; this normal mercury level is established when the mercury is in an unexpanded state, in other words, before it has been subjected to the heat of the burner, and while it is at the normal room temperature.

The normal mercury level is shown at $a$ Figure 2, and at $b$ Figure 2 is shown the approximate level of the mercury in the chamber 9 when the chamber 6 has been filled and the filler opening closed by the plug 28. The operation of setting the mercury level to normal will be described later on.

Other means are provided for the purpose of establishing different mercury working levels so that the device will operate for heating different quantities of liquid, and the normal mercury level previously referred to serves as a base or known point from which these working levels are measured; these other means comprise, referring particularly to Figures 4 and 5, a spacing member 30 of a graduated thickness, and a screw threaded regulating plug 31 extending loosely through the member 30 and entering the expansion chamber 9 through a side wall of the casing; the spacing member serves by reason of its graduated thickness to space opposing parts of the plug and casing at different distances from each other, and these different distances or spacings effect different mercury levels in the expansion chamber 9, which levels are designated as working levels.

The plug 31 has a head 32 for convenient manipulation, and the spacing member 30 is adapted to be clamped between this head and the casing, the latter having fixed thereto an angular index 33 adapted to engage with notches 34 formed in the inner inclined periphery of the member 30. These notches serve as graduations of the member 30 and on the face of the latter these graduations are properly designated to indicate time or quantity of liquid.

The operation of setting the mercury to a normal level is as follows:—

The notch marked zero, which is the thinnest part of the spacing member 30, is positioned in engagement with the index 33, and the regulating plug 31 screwed in so that the head 32 binds against the spacing member 30, the setting plug 29 is screwed outwardly a short distance, the device is then filled with mercury to give an approximate level in the chamber 9 as shown at $b$ Figure 2, the mercury is in an unexpanded state; the gas is now turned on full by the actuating handle 17 and the burner lighted with the small port 24 of the spindle positioned in communication with the primary outlet port 13 of the plug; in this position of the parts a full flow of gas is passing through the secondary outlet port 11 of the plug to the burner, producing a full flame; the setting plug 29 is then screwed inward until the mercury just seals the secondary outlet port 11 of the plug, which point will be indicated by observation of the lowering of the flame, and this sealing point represents the normal working level. The regulating plug 31 may now be retarded and the spacing member 30 positioned to effect any desired mercury working level, the regulating plug in all cases being screwed home against the spacing member.

At Figure 11 is shown the preferred form of casing, in which the latter is cut away at its top side to provide the usual 90° stops, which in this case serve to limit the movement of the actuating handle of the plug. In this figure the secondary outlet port of the plug 10 is omitted, and there are also shown in this particular figure as well as in Figures 13 and 14, the arrangement of inlet and outlet ports of the plug opposite each other, and in the spindle 21 two large ports 37, 38, are provided respectively opposite and in communication with the ports 23, 24. In the construction shown at Figures 11, 13, and 14, the intake and egress gas nozzles, the lateral inlet and outlet ports in the gas plug, and all four of the lateral openings in the spindle are in the same horizontal plane, and therefore gas comes from the intake nozzle 2 in a straight course through all ports or outlets into the egress nozzle 3 and in a direct line with the center of the mixing chamber 5 of the burner, and by providing these ports 37 and 38 in the spindle, it is not necessary to be particular that the spindle does not obstruct in whole or part the inlet port 12 of the plug, and furthermore, the lower end of the spindle need not be hollow but the entire spindle may be solid except as to the piercings which provide the four lateral openings 23, 24, 37 and 38.

Instead of the form of cap 19 shown at Figures 1, 3, and 4, a plain disk top 39 may be secured to the casing by screws 40, and, in order that the spindle 21 may not have any undue play, a coil spring 41 is provided which surrounds the spindle and is confined between the top of the plug and the underside of the head 25.

The pin 26 serves as a telltale, since, when it is in line with the handle 17, when the latter has been swung to position for admitting gas to the burner, it indicates that a full flow of gas is supplied to the burner, through a large outlet in the spindle, and when this pin is in a position at right angles to said handle in such position, it indicates that the flow of gas, so far as the spindle is concerned, is choked.

Having thus described my invention what I claim as new and desire to secure by Letters Patent is:—

1. In combination with a gas burner, a casing having a gas inlet, a gas outlet, and further having an expansion chamber at its lower end, a plug fitted in the casing and having a central bore extending through the lower end of the plug and further having a lateral port registrable with the gas inlet, said plug having a channel registrable with the gas outlet and having a second lateral port communicating with the central bore, means to rotate the plug, a spindle threaded into the plug and having its lower end extending into the bore of the plug and provided with a bore communicating with the bore of the plug, said spindle being formed with a plurality of outlets of varying sizes for communicating with the bore of the plug, means to rotate the spindle independently of the plug, and expansible and contractible means in the expansion chamber responsive to the heat from a wall of the burner to seal and unseal the bore of the plug upon expansion and contraction of said means.

2. In combination with a gas burner, a casing having a gas inlet and a gas outlet and having an expansion chamber, a plug in the casing having a bore and a port communicating with the expansion chamber and with the gas inlet, said plug further having a channel and a second port communicating with the gas outlet and with the bore, means to rotate the plug, a spindle rotatable in the plug and having a bore communicating with the bore of the plug and further having a series of ports for communicating with the second port of the plug, means to rotate the spindle independently of the plug, and expansible and contractible means in the expansion chamber responsive to the heat from a wall of the burner to seal and unseal the bore of the plug upon expansion and contraction of said means.

3. In combination with a gas burner, a casing having a gas inlet and a gas outlet and having an expansion chamber, a plug rotatable in the casing and formed with a bore having communication with the expansion chamber and with the gas inlet and also having a channel communicating with the gas outlet and with the bore of the plug, means to rotate the plug, a member rotatably carried by the plug and having a bore communicating with the bore of the plug and having a series of ports for establishing communication between the bore of said member and the channel, means to rotate the member, and expansible and contractible means in the expansion chamber responsive to the heat from a wall of the burner for sealing and unsealing the bore of the plug upon expansion and contraction of said means.

4. In combination with a gas burner, a casing having a gas inlet and a gas outlet and having an expansion chamber, a member rotatable in the casing and formed with a passage which communicates with the expansion chamber and gas inlet and further formed with a passage which communicates with the gas outlet and the first named passage, means to rotate the member, a second member rotatably carried by the first member and having a passage communicating with the first named passage of the first member and further having a series of ports communicating with the passage of the second member and with the second passage of the first member, means to rotate the second member independently of the first member, and a thermostatic medium in the expansion chamber responsive to the heat from a wall of the burner to seal and unseal the first named passage of the first member.

5. In combination with a gas burner, a casing having a gas inlet and a gas outlet, and having an expansion chamber, gas conducting means movably carried by the casing and formed with a passage communicating with the gas inlet and with said chamber and having a second passage communicating with the gas outlet and with the first passage, gas conducting means movably carried by the first gas conducting means and having a passage communicating with the first passage of the first means and having a series of ports for communicating with the second passage of the first means, means to actuate the first means, means to actuate the second means independently of the first means, and a thermostatic medium in the expansion chamber to seal and unseal the first named passage of the first means.

6. In combination with a gas burner, a casing having a gas inlet and a gas outlet and an expansion chamber, gas conducting means movable in the casing and formed to conduct gas from the inlet to the outlet and to have communication with said chamber, means to operate the first means, second gas conducting means movably carried by the first means and formed to have adjustable communication with the first named gas conducting means and with the gas outlet, means to operate the second means independently of the first means so as to regulate the amount of gas entering the gas outlet, and heat controlled means in the expansion chamber responsive to heat from a wall of the burner to cut-off and establish communication between the chamber and the first named gas conducting means.

7. In combination with a gas burner, means for supplying gas to the burner, heat controlled means responsive to the temperature of a wall of the burner and adapted to shut off a portion of said gas supply and to maintain such portion shut off so long as the remaining portion of said gas supply is permitted to burn.

8. In combination with a gas burner, means for supplying gas to the burner, heat controlled means, means comprising a heated wall of the burner body for actuating said heat controlled means to shut off a portion of said gas supply and to maintain such portion shut off so long as the remaining portion of said gas supply is permitted to burn, and regulable means to limit the effective action of said heat controlled means to varying predetermined periods of time.

9. In combination with a gas burner, means for supplying gas to the burner, heat controlled means adapted to shut off a portion of said gas supply, and heating means adapted to prevent a decrease in the temperature of said heat controlled means after such portion of the gas supply has been shut off and during the entire period of time thereafter in which the remaining portion of said gas supply is permited to burn, whereby such portion of the gas supply is maintained shut off during the entire period of time in which the remaining portion of said gas supply is permitted to burn.

10. In combination with a gas burner, means for supplying gas to the burner, heat controlled means adapted to shut off a portion of said gas supply, heating means adapted to prevent a decrease in the temperature of said heat controlled means after such portion of the gas supply has been shut off and during the entire period of time thereafter in which the remaining portion of said gas supply is permitted to burn, whereby such portion of the gas supply is maintained shut off during the entire period of time in which the remaining portion of said gas supply is permitted to burn, and means to limit the effective action of said heat controlled means to varying predetermined periods of time.

In testimony whereof I affix my signature.

JOHN H. ACKROYD.